INVENTOR.
NORMAN P. GOSS
BY
Meyer, Baldwin, Doan & Egan
ATTORNEYS

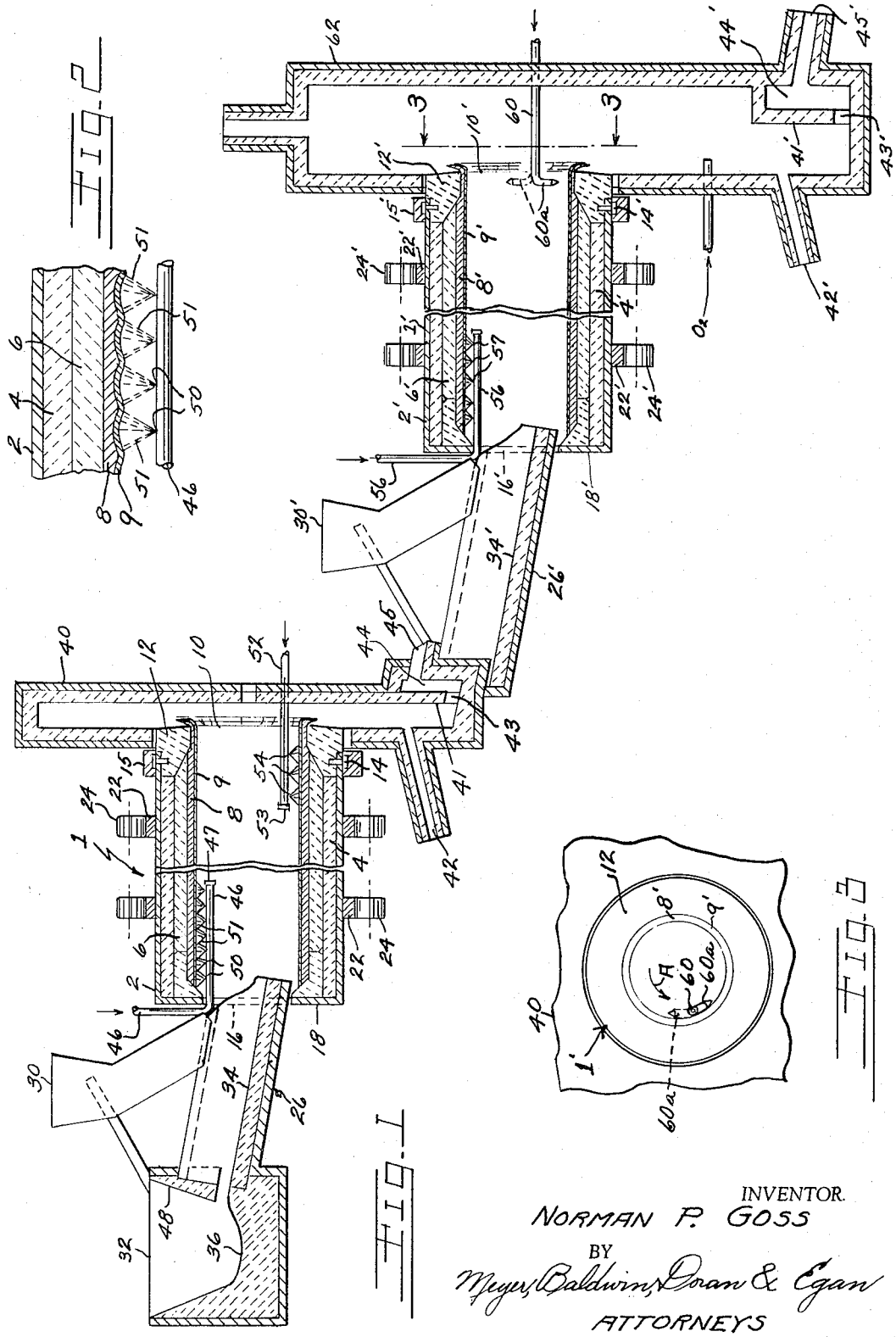

United States Patent Office 3,303,018
Patented Feb. 7, 1967

3,303,018
METHOD OF REFINING STEEL IN
ROTARY REACTOR
Norman P. Goss, Cleveland, Ohio, assignor of one-half to Fuji Iron & Steel Co., Ltd., Tokyo, Japan, a corporation of Japan
Filed Sept. 24, 1963, Ser. No. 311,015
25 Claims. (Cl. 75—51)

This invention relates to improvements in a method of treating molten iron whereby to reduce impurities in the iron to a desired level.

One of the objects of the present invention envisions the steps of subjecting a continuous stream of molten iron to flow under supergravitational forces while confined in a generally helical path, contacting the molten iron while traveling in said path with a flux for removing certain impurities from the iron, and subjecting the flux while traveling in said path to a gaseous jet stream directed against the flux with sufficient force to cause it to penetrate into the molten stream to increase the turbulent mixing of the flux with the molten iron.

Another object of the invention is to treat molten iron while traveling in a confined helical path as mentioned above with a jet of oxygen, or an inert gas, or a gas otherwise adapted to react with the stream moving in the helical path.

A further object of the invention is to control the depth of the molten iron stream at certain zones as the stream travels a helical path through a rotating cylindrical reactor, together with the impingement of jets of gaseous fluid into the stream at such zones whereby to control and improve the purification of the molten iron in a novel manner.

Still another object of this invention is the utilization of a gaseous jet stream directed at least partially tangentially of a molten stream traveling in a helical path in order to increase or decrease the speed of flow of the molten iron stream while at the same time increasing the turbulent mixing of a flux with the molten iron stream. Such use of a jet stream may be directed with a component in the downstream direction of the helical path whereby to decrease the size of the particles thrown off where the molten stream leaves its confined helical path. Another use of such a gaseous jet stream directed generally tangentially of the molten iron stream and in the upstream direction of the helical path may be utilized to increase the size of the discrete particles discharged from the helical path where it leaves its confining structure, even to the point of completely stopping the flow in the helical path whereby the molten stream may be discharged as a solid stream rather than in discrete particles.

Other objects and advantages of the present invention will be apparent from the accompanying drawings and description and the essential features will be set forth in the appended claims.

In the drawings,

FIG. 1 is somewhat diagrammatic showing of two rotating cylindrical reactors placed in tandem to carry out one embodiment of the present invention;

FIG. 2 is fragmental sectional view, enlarged, showing portion of one of the reactors of FIG. 1 and slightly distorted to illustrate a principle involved in this invention;

FIG. 3 is a fragmental elevational view taken generally along the line 3—3 of FIG. 1;

FIG. 4 is a central sectional view through a modified form of reactor illustrating other features of this invention, while

Figure 4:
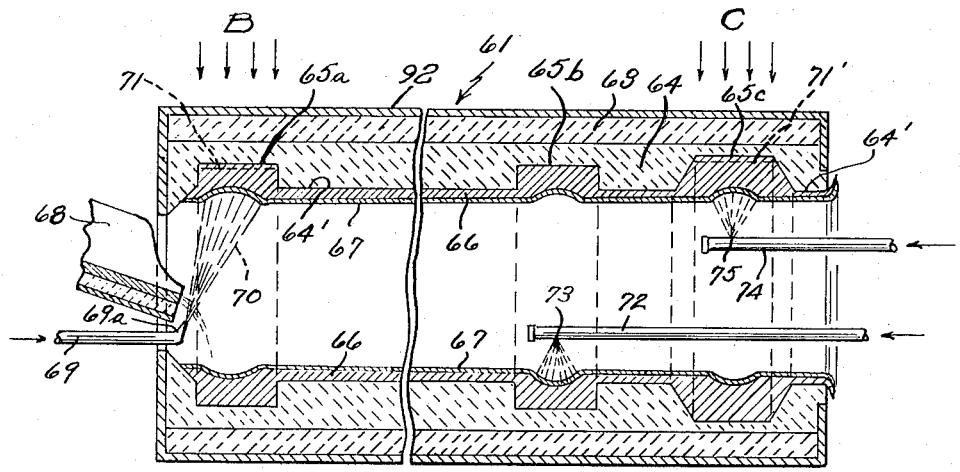

It is common practice at this time to make steel by some sort of batch process. Iron is tapped in batches from a blast furnace or the like, is then processed to steel in batches, either passing through an open hearth or L.D. process, or through an electric furnace or the like. The steel industry is rapidly becoming aware of the advantages of a continuous casting of steel. The present invention is a very advantageous method of producing steel in a substantially continuous manner which is particularly useful when coupled with the continuous casting process. The continuous production according to the present invention gives a closer control of the specifications of the finished steel than the batch processes mentioned above, gives a substantially uniform analysis of the finished product as against the varying analyses of the batches in the above-mentioned batch processes, and avoids the heavy expense of the batch processing machinery which must be of large size to reduce the unit costs and at the same time the present invention is a great saving in labor.

While varying types of apparatus might be utilized in carrying out the present invention, I have chosen to illustrate the same as utilizing a type of reactor similar to that disclosed and claimed in my United States Patent No. 2,866,703, granted December 30, 1958. In FIG. 1 I have shown two such reactors connected in tandem although later decription will indicate that this tandem connection is not essential to the principles of this invention.

Referring to the left-hand reactor in FIG. 1, a rotatable cylinder 1 comprises a steel shell 2 having a refractory lining 4 over which is placed a suitable layer of refractory material 6, which layer by way of illustration only might be dolomite. The steel shell 2 is equipped with annular metallic tires 22, which rest upon rollers 24 mounted for rotation on horizontal axes in such a manner as to insure as smooth as possible a rotational motion of the cylinder with its lining and contents. Means, not shown, is provided for rotating the cylinder at any desired speed but this invention contemplates speeds which produce a supergravitational force on a molten stream of metal traveling through the reactor of the order of 6 g. to 20 g.

The cylinder 1 has at its discharge end 10, a nose ring 12, preferably constructed of refractory material as shown, and held in place against the steel shell by means of bolts 14. A retainer ring 15 is secured to the steel shell 2 and serves as a baffle between a collection hood 40 and the cylinder 1. At the feed end 16 of the cylindrical reactor is a dam ring 18 with suitable contours of the insulating layers 4 and 6 so as to maintain a layer of molten metal with the ring 18 extending a sufficient distance inwardly from the periphery of steel shell 2 to insure discharge of the molten metal at the other end of the cylinder indicated at 10.

While the molten metal and the treating layer such as a flux may be introduced at separate points, the structure here shown involves a runner 26 for introducing both of these materials to the reactor. The flux materials are introduced through the chute 30 and are normally of such a character that they melt at the temperature of the molten metal immediately before or upon introduction into the reactor. In this case, for the treating of molten iron ore, the flux is usually composed of CaO, $CaF_2$, $NaCO_3$, FeO, $Al_2O_3$ and other flux materials commonly met with in the steel industry. These are fluid or of low viscosity in the temperature range 2300° F. to 2500° F. which is below the normal temperatures of the molten iron. The molten iron is introduced through the tundish 32 which is lined with suitable refractories 36 and 48, and the runner 26 has a suitable refractory lining shown at 34. The supply of molten metal for the tundish 32 may be from any suitable source.

In the present description, it is assumed that silicon, sulphur and phosphorous are removed in the left-hand reactor in FIG. 1 while carbon is reduced chiefly in the right-hand reactor of the same drawing. However, this division of function is not absolutely necessary. The composition of the flux material is preferably adjusted so that the silicon is first removed, and the sulphur and phosphorous are removed farther along the path in the reactor. Since the time of retention of the molten metal stream in the reactor can be controlled in various ways, almost any desired commercially acceptable removal of silicon, sulphur and phosphorous is possible. In this type of reactor and using the present invention, slags of high fluidity can be used, and even slags which foam can be handled. It is believed that this is an unusual capacity not found in other processes, but possible in that described herein. Another outstanding feature of this invention is that the silicon, sulphur and phosphorous can be removed efficiently even when the slag volume is very high.

It should be understood that in the use of this invention, with the raw materials introduced at the left-hand end of the reactor cylinder, and with the cylinder rotating about its own longitudinal axis, the travel of the material through the cylinder is in a generally helical path from left to right as viewed in FIG. 1.

Those familiar with this art will understand that the flux material interacts with the impurities in the molten stream so that the discharge from the right-hand end of the reactor is a mixture of molten iron and slag. This discharges into a collector or tower 40 which may be equipped with a stack to discharge fumes, if necessary or desirable. The discharged material falls into the bottom of the tower where the slag floats on top of the molten iron on the left side of the baffle 41 and may be drained off through the slag runner 42. The molten iron passes through the opening 43 beneath the baffle 41 into chamber 44 from which it is discharged through iron notch 45 to any desired point of use.

In this type of reactor, sulphur may be removed in less than ten seconds and silicon in less than thirty seconds, when processing pig iron at a rate of one ton per minute. This same rate of impurity removal may be maintained even up to about five tons per minute.

The present invention improves the rate of reaction between the flux and the impurities in the molten iron stream by utilizing gaseous jets which impinge upon the combined layers of molten iron and/or flux in a manner to decrease the reaction time by a factor of two or more. Referring to the left-hand reactor in FIG. 1, a lance for the introduction of gaseous fluid is shown at 46 as being introduced toward the opening at the left-hand end of the reactor and positioned near the upper inside diameter of the reactor. This lance is closed at one end 47 and is provided with a plurality of flute-like jet openings 50 directed upwardly against the roof of the reactor cylinder. Referring to FIGS. 1 and 2, the jet openings 50 are preferably circular and pointed upwardly so that jet streams indicated at 51 flow upwardly and outwardly and either preferably touch or slightly overlap where they engage against the layer of flux material 9 which is radially inward of the layer of molten material 8 which in turn rests against the refractory lining 6. This separation of the layers 8 and 9 occurs because of the different density of the two materials. It should be understood that in a reactor as shown here having an inside diameter of about one foot, the depth of metal suggested for the layer 8 would be about one inch in radial depth. The depth of the layer 9 is much less but is exaggerated in FIG. 2 to illustrate the principle involved. The placing of the jets 50 with respect to the roof of the reactor and the pressure applied is sufficient to cause the flux layer 9 to be driven into the metal layer 8 but preferably not sufficient to drive the flux layer against the refractory lining 6. If the metal layer 8 is retained substantially intact against the refractory, then the refractory lasts much longer and is not eroded by contact with the flux material. In actual practice, the formation is not smooth as indicated in FIG. 2 but instead is more rough and turbulent. Into the lance 46, I prefer to introduce argon and sodium or nitrogen and sodium, or all three gases, or even hydrogen in those situations where the desire is chiefly to increase the reaction between the iron layer 8 and the flux layer 9. If additional heat is desired, then oxygen may be introduced in the lance 46 either with or without a gaseous or oil fuel. The molten iron ore may be introduced in the left-hand reactor of FIG. 1 at a temperature as low as 2350° F. but is so quickly heated up in the reactor to about 2800° F.

More than one lance may be utilized in the reactor. For instance, the right-hand end of FIG. 1 shows a lance 52 which is closed at 53 and provided with a plurality of jet openings 54 similar to those mentioned at 50 and which sends jet streams transversely of the layer 9 impinging against the layer 8 near the bottom of the reactor. The gases introduced at the lance 52 need not necessarily be the same as those introduced at the lance 46.

The rotational speed of the reactor 1 will depend upon the impurity content of the metal being processed. In general, the rotational speed used will be just sufficient to completely cover the inner periphery of the refractory lining 6 and to permit droplets of the metal and flux to fall from the uppermost inner surface of the reactor in a rain-like condition. The supergravitational force necessary to bring about this condition is between about six to eight times that of gravity. In some metal refining operations this may be a very desirable method for increasing the mixing of the layers 8 and 9, especially when the flux and slag volume is high.

The metal leaving the left-hand reactor of FIG. 1 at 45 will be pure iron plus three to four percent carbon. This metal may be immediately converted to steel or it may be stored in a mixer ladle or the like to be processed to steel as needed. It is well known that this combination of pure iron with three to four percent of carbon content can be stored for long periods of time without danger of freezing.

Whether subject to intermediate storage or not, the iron with high carbon content may be immediately processed to steel in a second reactor 1' shown at the right-hand side of FIG. 1 and in which all of the parts have been given the same reference characters as in the first described reactor except that the references are given a prime suffix. The product of the first reactor discharged at iron notch 45 will be delivered by the runner 26' into the second reactor 1'. In this case, FeO will be fed into the runner through the chute or hopper 30'. A lance 56 similar to that previously described at 46 may be introduced through the left-hand open end of the reactor and provided with a plurality of flute-like jet streams 57 to impinge against the flux layer 9' and drive it into the iron layer 8' to give a quick and intimate mixture at the feed end of the reactor. Care is taken so as not to cause the mixing to become violent and uncontrollable, or even explosive. The mixture supplied to the lance 56 is preferably oxygen mixed with a fuel gas or fuel oil so as to rapidly heat the FeO lying on the radially inner surface of the liquid iron. The heat gradient in this second reactor will run from approximately 2350° F. to 2650° F. or more at the feed end to around 3000° F. or more at the discharge end. If desired, as the stream of molten iron plus flux enters the reactor 1' from the runner 34', an injector lance of jet type may be utilized as described in connection with FIG. 4 hereinafter to thoroughly mix the iron and flux at the initial point of entrance to the reactor. In this way, using the lance 56 with or without the superjet injector lance of FIG. 4, the FeO is forced deeply into the metal quickly upon entrance to the reactor 1'. In this way, complete mixing is assured. The reaction will be violent and turbulent, but since the amount of metal being acted upon is small in volume, the danger of having uncontrollable explosive flow is completely avoided.

Preferably the pressure at the jets 57 is so controlled as to cause the FeO to penetrate deeply into the molten iron layer 8' but not sufficient to reach the refractory lining 6'. This is possible since the metal is under supergravitational forces and the tendency is to cause the pure iron to take a radially outward position against the refractory layer 6' while the lighter impurities separated therefrom are on the radially innermost layer where they cannot harm the refractory lining. Thus, by control of the supergravitational forces, by lance pressures, and by the depth of the FeO penetrating the molten layer 8', nearly pure iron can be kept in contact with the refractory lining 6'.

Each time the layers 8' and 9' pass the jets 57, or jets like that described in connection with FIG. 4, or jets at the opposite end of the reactor as previously described, depressing action forcing the layer 9' into the layer 8' occurs and this assures thorough mixing which makes it possible to control the end point of the carbon reaction within very close limits. For instance, using a source of iron having a reasonably constant carbon content, and maintaining a uniform flow, it is possible to measure the carbon content of steel discharged from reactor 1' and to vary the volume and/or pressure of oxygen applied by the lances so as to maintain a desired final carbon content. This is one of the great advantages of this invention.

Another advantage is that it is possible to superheat the flux layer 9' and the metal surface engaged therewith, without danger of overheating the refractory lining. This increases the rate of reaction between the layers 8' and 9'. With the small volume of iron flowing through reactor 1', it is possible to use FeO as a flux plus the oxygen lances to provide rapid decarbonization at 2800° F. or higher without the danger of explosive reaction if this were attempted in the batch process.

Another advantage of the flute-like lance 56 is that it will burn the carbon to carbon monoxide and then to carbon dioxide, thus superheating the surface. Therefore, under these conditions, no fuel will be required at this point.

Referring to FIGS. 1 and 3, a lance 60 may be introduced at the right-hand end of the reactor 1' to give an additional effect over and above that described in connection with previous lances. This lance 60 may have one of two positions indicated in the drawings depending upon the purpose for which it is used. Referring to FIG. 3, it is assumed that the rotation of the reactor 1' is in the direction of the arrow A. The inner end of the lance 60 is turned generally about at a right angle and may either have a full line position where it is turned downstream of the helical path of the molten stream through the reactor, or a dot-dash position where it is turned upstream of the helical path. When the lance 60 has its end 60a turned tangentially downward as shown in FIG. 3 and that is downstream with respect to the helical path represented by the directional arrow A in FIG. 3, then the action of the jet lance enhances the speed of circumferential flow of the mixed stream 8', 9' around the helical path so that the speed of the rotation of the reactor together with the enhancement of the lance 60 will cause the metal to be ejected as very finely divided droplets. This enhances the further purification which may occur in the tower 62 as presently described. These fine droplets are quickly decarbonized by oxygen in the tower 62 because these droplets present a very large surface area compared to their volume and because the droplets are elongated as they are ejected at high speed from the discharge end 10' of the reactor 1'.

One use of the lance 60 having its end 60a turned in the dot-dash direction indicated in FIGS. 1 and 3, or upstream of the helical path, is to slow down the combined stream 8', 9' at the exit end of the reactor. Using the lance in this manner, one may use a high rotative speed of the reactor 1' to completely coat the interior surface of the reactor so as to get the desired speed of decarbonizing reaction in reactor 1', but doing away with the collecting tower 62 at the exit end, if desired. In other words, the jet propelled from one or more lances 60 in the dot-dash position of the lance end 60a is so arranged and of sufficient force to stop the flow of the combined metal and flux stream through the helical path previously described and to permit the discharge of this combined stream in solid stream form at the exit end 10'.

In the production of tonnage steels, such as tin plate, it is essential to have a rotor reactor of this type operate over long periods of time without interruption. Causing the metal to leave the rotor as a solid stream, instead of in highly dispersed particles, reduces the wear and deterioration of the discharge end of the rotor, i.e., the refractory life there is greatly increased.

Figure 5:
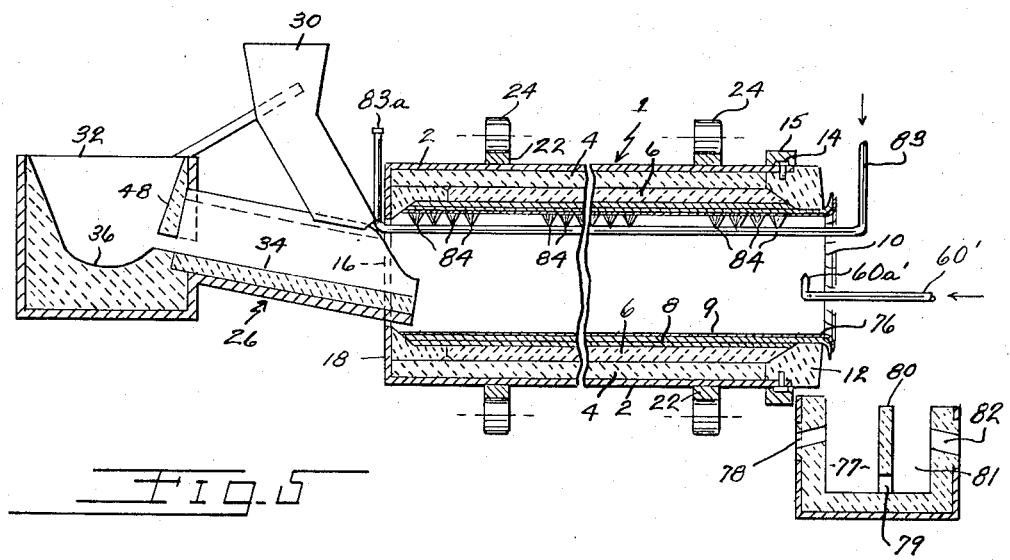
FIG. 5 is a central sectional view through a rotary cylindrical reactor illustrating other embodiments of this invention.

Also, the compacting lance, which is used upstream against the helical path as shown in FIGS. 3 and 5, causes the metal to leave the rotor as a solid stream; when using oxygen effects rapid purification, especially in carbon reduction to 0.015 percent and under.

A further modification of this invention is shown in FIG. 4. This modification could be applied to either reactor 1 or the reactor 1' or a reactor in that position. Here the reactor 61 has a steel shell 92 within which are suitable refractory linings 63 and 64. The radially innermost refractory lining has a generally cylindrical, internal diameter 64' which is provided at one or more zones with a recessed annular pocket 65a, 65b or 65c, which pockets are rather sharply defined from the cylindrical surface 64' and are of limited longitudinal extent and of greater diameter than the internal diameter 64'. Preferably, such pockets would not be more than six inches in longitudinal extent and approximately one inch in depth beyond the internal diameter 64' in a reactor having a metal layer 66 approximately one inch in radial depth and a flux layer 67 which is much thinner in radial dimension. Actually, the stream 66, 67 is radially thicker at the inlet end and radially thinner toward the discharge end, as indicated in FIG. 4. The pocket 65c is shown of greater diameter than the other pockets, say about three times the average radial depth of metal along the cylindrical reactor. This permits greater lance pressure at 75 and greater depth of jet penetration without erosion of refractory 64. Also, the end walls of pocket 65c are shown inclined longitudinally rather than in radial planes.

The stream of molten metal and flux enters the reactor from a runner 68 and another modification of this invention is embodied in a lance 69 having an upturned end 69a which discharges a jet of great force and velocity across the mixed stream of molten metal and flux as it discharges from the runner 68 into the reactor 61. This mixes the entering stream and discharges it roughly in the form of a conical spray indicated in broken lines at 70 and drives the same against the metal layer 66 and the flux layer 67 in the pockets 65a. This combined action of the jet from 69a commingling the metal and flux and throwing it violently into the pocket 65a causes a tremendous intimate mixture of the flux and metal stream at this point. Where the purpose of the reactor 61 is a decarbonizing one, the flux will be FeO as previously mentioned and this will act rapidly to decarbonize the iron in the pocket 65a. If necessary or desirable, a water jet may be sprayed on the exterior of the reactor from the locations indicated by the arrows B and C so as to freeze a layer or skull of pure iron at 71 or 71' against the radially outermost wall of the pockets 65a and 65c. Note that the thinner wall of refractory at these points aids the cooling action. Such skulls of iron protect the refractory lining against erosion which would contaminate the metal with undesirable inclusions, such as $SiO_2$, $Al_2O_3$, and the like.

At the pocket 65b a lance 72 is shown having a jet opening at 73 for directing a jet of any suitable gas such as oxygen against the combined layers of flux and metal in the pocket 65b so as to cause more intimate mixing there, thus increasing the rate of reaction between the flux and the metal and increasing the decarbonization action. A similar lance 74 may be provided with a jet 75 impinging against the flux and metal layer in the pocket 65c for the same purpose as described in connection with the lance 72. The purpose of the annular pockets 65a, 65b, and 65c is to increase the metal holding capacity of the reactor and to provide zones for deeper peneration of impinging jet streams against the combined flux and metal layers without harming the refractory lining 64.

In FIG. 5, still another modification of this invention is shown in connection with a reactor exactly like that described in connection with reactor 1 in FIG. 1. A change here is the elimination of the tower 40 at the discharge end of the reactor which is possible because of a certain arrangement of a lance 60' at the discharge end of the reactor. The end 60a' of this lance is turned upwardly as indicated in broken lines in FIG. 3 upstream of the normal rotational movement of the helical path of travel of the mixture of molten metal and flux as it moves through the reactor from the left end to the right end. As indicated in connection with FIG. 3, the effect of the high velocity jet stream emerging countercurrent to the helical path of the material traveling through the reactor is to slow down the combined metal and flux stream. In this instance, however, the stream is of such velocity and of such force that it completely stops the travel of the metal and flux in a helical path and instead causes all of this material to fall to the bottom of the drum at the point 76 so that it is discharged in the form of a solid stream, thus doing away with the necessity of the tower 40. The metal then falls into the refractory pocket 77 in which the slag settles to the top and is removed through the slag notch 78. The iron passes through opening 79 in the baffle 80 into the chamber 81 and is discharged through the iron notch 82.

Another modification in FIG. 5 is the provision of a lance 83 which is different from those previously described. This lance enters into one end of the reactor, passes parallel to the axis of the reactor and out the other end where it is preferably capped at 83a. Any desired number of jet openings 84 are provided at one or more places along the length of the reactor in such a location as to impinge against the flux layer and drive it into the metal layer as previously described in connection with the lances 46 and 56.

It should be understood throughout this description that any of the lances herein described are suitably protected by heat insulation material and water jackets in order to prevent their destruction in performing their intended purpose.

What is claimed is:
1. The method of treating molten iron comprising the steps of subjecting a continuous shallow depth stream of said molten iron to flow under supergravitational forces while confined in a generally helical path, contacting said molten iron in said path with a molten flux for removing certain impurities from said iron, said supergravitational forces separating said iron and said flux into radially outer and inner layers respectively, and subjecting said molten stream in said path to at least one jet stream directed against said flux in a radially outward direction with sufficient force to drive said flux layer into said metal layer to increase the turbulent mixing of said flux with said molten iron, whereby the reaction time is greatly decreased.

2. The method of claim 1 wherein said jet stream contains oxygen.

3. The method of claim 1 wherein said jet stream contains an inert gas.

4. The method of claim 1 wherein said jet stream contains a gas adapted to react with the materials moving in said helical path.

5. The method of claim 1 including increasing the radial depth of said molten iron stream opposite the point of impingement of said jet stream only.

6. The method of claim 1 including increasing the radial depth of said molten iron stream for a short distance at the upstream end of said helical path, contacting said molten stream there with said flux, and subjecting said flux and molten stream there to a gaseous jet stream directed transversely of said path and depressing said flux into said molten stream with increased turbulence at said zone of increased depth.

7. The method of claim 6 wherein said jet stream is chiefly oxygen whereby to burn out impurities in said iron, and the pressure of said jet stream is insufficient to penetrate completely through said molten stream.

8. The method of claim 1 wherein said molten stream has an average radial depth of less than two inches, said flux is chiefly FeO, and said jet stream comprises oxygen for developing a temperature in said molten stream of at least approximately 2800° F.

9. The method of claim 1 wherein said jet stream is provided with sufficient force to penetrate the major portion of said stream of flux and molten iron, and with insufficient force to strike the surface confining said stream in said generally helical path.

10. The method of claim 1 wherein said supergravitational forces are of the order of approximately six to eight times gravity.

11. The method of claim 1 wherein said flux is FeO, said jet stream is oxygen, and said supergravitational forces and the radial depth of said flux and the pressure and amount of said jet stream are so adjusted that substantially pure iron provides a radially outermost layer in said molten stream.

12. The method of claim 1 wherein the radial depth of said molten stream plus said flux is sufficient to protect the radially outermost surface of said stream from excessively high temperature when the radially innermost surface thereof is superheated.

13. The method of claim 1, wherein the radial depth of said molten stream plus said flux is sufficient to limit the temperature of the radially outermost surface of said stream to not substantially over 2800° F. when the radially innermost surface thereof is superheated to the range of 3000° F. to 3600° F.

14. The method of claim 1 wherein said confinement in a generally helical path is by means of a container generally cylindrical in form, and said supergravitational forces are provided by continuous rotation of said container.

15. The method of claim 14 including subjecting said molten stream to a plurality of said jet streams arranged along the length of said cylindrical container.

16. The method of claim 1 including subjecting said molten stream to a plurality of said jet streams spaced along said helical path.

17. The method of treating molten metal including the steps of subjecting a continuous stream of molten metal and of molten treating agent to turbulent flow in a generally helical path in a metal-advancing zone, forming and confining said stream into a generally hollow cylindrical shape in said zone and rotating said cylindrical shape whereby said metal and treating agent are subjected to supergravitational forces and generally carried in said helical path in said zone and separated into layers arranged radially according to their specific gravities, and subjecting said molten stream in said path to a plurality of jet streams directed against said molten stream in a direction and with sufficient force to mix said layers, said jet streams being fixed relative to said rotation whereby said molten stream is subjected to said jet streams each time said molten stream is carried past them by said rotation.

18. The method of claim 17 wherein said molten metal is iron, said treating agent contains FeO, and said jet streams contain oxygen, whereby carbon is removed from said iron to produce steel.

19. The method of claim 18 including the steps of stabilizing the flow of said molten iron and repeatedly determining the carbon content of the metal discharged from said helical path, and varying the application of oxygen through said jet stream and through said FeO treating agent to control the final carbon content of said molten stream at discharge.

20. The method of treating molten iron comprising the steps of subjecting a continuous stream of said molten iron to flow under supergravitational forces while confined in a generally helical path, contacting said molten iron in said path with a flux for removing certain impurities from said iron, and subjecting said flux in said path to a jet stream directed against said flux with sufficient force to increase the turbulent mixing of said flux with said molten iron, whereby to decrease the reaction time, and including the step of allowing said molten stream to leave said path unconfined, thereby disrupting said molten stream outside of said helical path to form discrete particles of said molten iron, said jet stream being directed at least partially tangentially of and in the downstream direction of said helical path whereby to decrease the size of said discrete particles.

21. The method of treating molten iron comprising the steps of subjecting a continuous stream of said molten iron to flow under supergravitational forces while confined in a generally helical path, contacting said molten iron in said path with a flux for removing certain impurities from said iron, and subjecting said flux in said path to a jet stream directed against said flux with sufficient force to increase the turbulent mixing of said flux with said molten iron, whereby to decrease the reaction time, including the step of allowing said molten stream to leave said path unconfined, said jet stream being directed at least partially tangentially of and in the upstream direction of said helical path near the point where it leaves said path, whereby to increase the size of said particles or to solidify said stream.

22. The method of treating molten iron comprising the steps of subjecting a continuous stream of said molten iron to flow under supergravitational forces while confined in a generally helical path, contacting said molten iron in said path with a flux for removing certain impurities from said iron, and subjecting said flux in said path to a jet stream directed against said flux with a force to increase the turbulent mixing of said flux with said molten iron, whereby to decrease the reaction time, and including the step of allowing said molten stream to leave said path unconfined at a discharge point, at least one of said jet streams being directed at least partially tangentially of and in the upstream direction of said helical path just ahead of said discharge point and with sufficient force to stop the flow of said molten stream in said helical path permitting the same to discharge in a solid stream.

23. The method of treating molten iron comprising the steps of subjecting a continuous stream of said molten iron to flow under supergravitational forces while confined in a generally helical path, contacting said molten iron in said path with a flux for removing certain impurities from said iron, and subjecting said flux in said path to a jet stream directed against said flux with sufficient force to increase the turbulent mixing of said flux with said molten iron, whereby to decrease the reaction time, including increasing the radial depth of said molten iron stream opposite the point of impingement of said jet stream, and cooling a wall confining said stream in said generally helical path sufficiently to freeze a radially outermost layer of said iron stream.

24. The method of claim 1 wherein said jet stream contains oxygen together with a fuel.

25. The method of claim 23 including the step of rotating said cylindrical shape at a rate such that the supergravitational force is between about six to eight times that of gravity, whereby droplets of metal and flux fall from the uppermost inner surface of said cylindrical shape in a rain-like condition.

References Cited by the Examiner

UNITED STATES PATENTS

| | | | |
|---|---|---|---|
| 2,693,411 | 11/1954 | Cremer | 75—52 |
| 2,862,811 | 12/1958 | Eketorp et al. | 75—60 |
| 2,866,703 | 12/1958 | Goss | 75—52 |
| 2,962,277 | 11/1960 | Morrill | 75—60 |

BENJAMIN HENKIN, *Primary Examiner.*